A. BIPPART.
KEY RING.
APPLICATION FILED JAN. 12, 1910.
962,882.
Patented June 28, 1910.
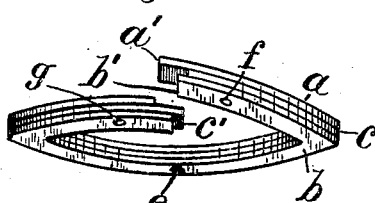
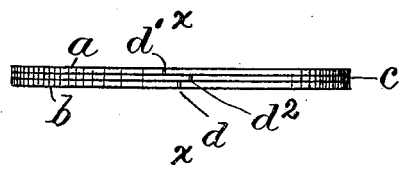
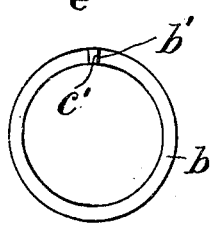
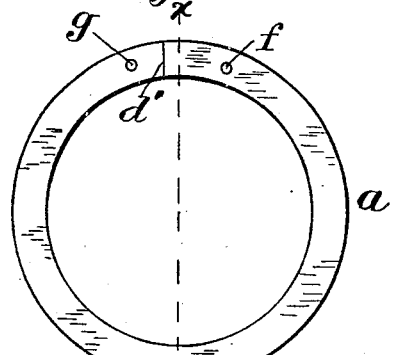
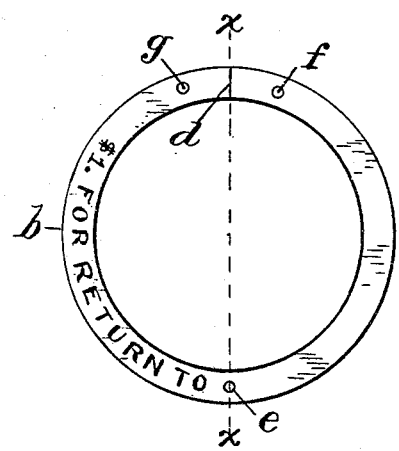
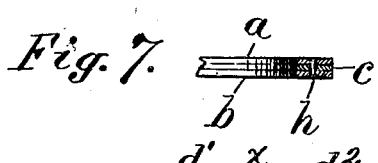
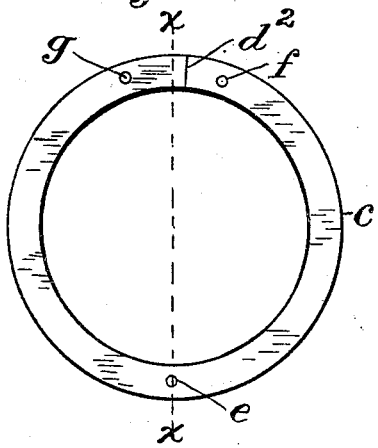
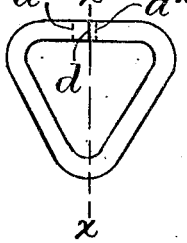

UNITED STATES PATENT OFFICE.

ACHILL BIPPART, OF NEWARK, NEW JERSEY.

KEY-RING.

962,882.  Specification of Letters Patent.  Patented June 28, 1910.

Application filed January 12, 1910. Serial No. 537,715.

*To all whom it may concern:*

Be it known that I, ACHILL BIPPART, a citizen of the United States, residing at 36 Ingraham Place, Newark, county of Essex, and State of New Jersey, have invented certain new and useful Improvements in Key-Rings, fully described and represented in the following specification and the accompanying drawings, forming a part of the same.

This invention relates to a key-ring having engaging or connecting ends provided at the joint with a tongue and recess adapted to interlock and to normally prevent lateral movement at the joint, so that the locked ends can only be separated by straining them apart in the plane of the ring.

The ring is formed of three circular layers divided each at one point in the circumference, with the ends contiguous at opposite sides of the division; the three layers being secured together by riveting or otherwise, so that the middle layer projects a little beyond the other layers at one side of the joint and a little within the other layers at the opposite side of the joint, the projecting end of such middle layer forming a tongue, and the space between the outer layers forming a recess at the opposite side of the joint to receive the said tongue.

The several layers are made identical and the disposition of their separate joints to form the tongue and recess is effected by punching holes in the layers in various relations to their joints, so that when rivets are inserted through the holes the ends of the middle layer form the tongue and recess as desired. By this method of manufacture, the layers are all made identical by suitable machinery, the divisions of the layers suitably cut and the holes punched in them in a suitable manner to secure the overlapping engagement at the joint of the ring.

The invention will be understood by reference to the annexed drawing, in which—

Figure 1 represents the key-ring of natural size with the ends sprung apart to separate the joint of the ring; Fig. 2 is a perspective view showing the ends of the ring separated laterally; Fig. 3 is an edge view of the ring with the ends engaged; Fig. 4 shows the rear layer of the ring; Fig. 5 the front layer, and Fig. 6 the middle layer. Fig. 7 is a section at one side of the ring through one of the rivet-holes; and Fig. 8 shows the invention applied to a three-sided ring. Figs. 4, 5 and 6 show three layers $a$, $b$ and $c$ all identical, with a single radial cut or division in each.

A dotted line $x$—$x$ is shown in Figs. 3 to 6 inclusive corresponding to the division or joint $d$ in the connection $b$.

Three holes are shown in each of the layers in Figs. 4, 5 and 6, one hole $e$ being at one side of the ring and two holes $f$ and $g$ being disposed at opposite sides of the division $d$, but in different relations to such division in the different layers. A division is shown in each of the layers with the divided ends in contiguity in each layer.

In the layer $b$ shown in Fig. 5, the division $d$ is equi-distant from the holes $f$ and $g$; in the layer $a$ shown in Fig. 4, the division $d'$ is nearer to the hole $g$, and in the layer $c$ shown in Fig. 6 the division $d^2$ is nearer the hole $f$.

When the three layers are united by rivets $h$ (see Fig. 7) the ends or joints of the layers $a$ and $b$ both overlap the ends of the layer $c$ at one side of the ring-joint as shown in Fig. 3, thus forming a tongue-and-groove engagement. This is also clearly indicated in Fig. 2, where the end which forms the tongue is lettered $c'$ and the projecting parts which form the recess or groove to receive the tongue are lettered $a'$ and $b'$.

It is obvious that the engagement of the tongue with the recess or groove normally prevents any lateral movement or displacement, and that the joint of the key-ring can only be opened by first straining the ends apart in the plane of the ring itself. When the two ends are thus strained apart at the joint they may be spread laterally to insert the key.

Fig. 1 shows the joint of the ring strained apart in the plane of the ring to disengage the interlocking parts; while Fig. 2 shows the ends of the ring separated sidewise to insert a key.

The circular layers are readily formed by stamping from sheet metal and the three holes $e$, $f$ and $g$ are punched at the same time by suitably arranged punches, and no manual labor is therefore required to make the ring except the insertion of the rivets in the holes. The holes $f$ and $g$ are at one side of the ring while the hole $e$ is at the opposite side leaving the layers detached from one another through the intervening segment which is nearly half the circumference of the layer. This gives the ends of the ring which require separation a peculiar flexibility and enables them to be moved apart and held apart with great facility when inserting the key upon the ring.

When the invention is applied to an oval ring or one of three or more sides, the layers are also made identical and the divisions are cut in different relations to the axis of the ring as indicated upon the three-sided ring in Fig. 8, where the division $d$ is drawn in full lines coincident with the axis $x$—$x$, and the divisions $d'$ and $d^2$ are indicated in dotted lines at opposite sides of such axis, as upon the ring in Fig. 3. This construction is adapted to the manufacture of brass, silver or gold rings. The edges or outer corners of the ring may be round if desired; but it is preferable to leave a considerable portion of the outer side of the ring flat to apply an inscription as shown in Fig. 5 where the words "One dollar for return to" are inscribed with space following for the name and address of the owner.

I am aware that key-rings have been made of layers having each a gap or space at the division, but not adapted to form a tongue and groove joint which prevents lateral movement as in my construction.

Having thus set forth the nature of the invention what is claimed herein is:

A key-ring having three completely circular layers each divided at one point with the divided ends in contiguity and said layers fixedly secured together with the divisions of the several layers arranged to form a tongue upon the middle layer at one side of the joint of the key-ring and a recess between the two outer layers at the opposite side of the joint, the tongue and recess forming interlocking ends upon the layers and normally preventing lateral movement at the joint.

In testimony whereof I have hereunto set my hand in the presence of two subscribing witnesses.

ACHILL BIPPART.

Witnesses:
L. LEE,
THOMAS S. CRANE.